United States Patent [19]
Norimatsu

[11] Patent Number: 5,950,138
[45] Date of Patent: Sep. 7, 1999

[54] HAND-HELD TELEPHONE SET

[75] Inventor: Noriko Norimatsu, Tokyo, Japan

[73] Assignee: NEC Corporation, Tokyo, Japan

[21] Appl. No.: 08/572,718

[22] Filed: Dec. 14, 1995

[30] Foreign Application Priority Data

Dec. 15, 1994 [JP] Japan .................................. 6-332923

[51] Int. Cl.$^6$ .................................................. H04Q 7/20
[52] U.S. Cl. ........................ 455/550; 455/551; 455/565; 455/575
[58] Field of Search ................................. 379/58, 59, 60, 379/62, 57; 455/33.1, 33.2, 403, 422, 432, 435, 436, 463, 550, 551, 552, 558, 565, 575, 90

[56] References Cited

U.S. PATENT DOCUMENTS

| | | | |
|---|---|---|---|
| 4,742,560 | 5/1988 | Arai ......................................... | 455/551 |
| 5,020,091 | 5/1991 | Krolopp et al. ........................... | 379/58 |
| 5,222,127 | 6/1993 | Fukui ........................................ | 379/58 |
| 5,428,666 | 6/1995 | Fyfe et al. ................................. | 379/58 |
| 5,442,806 | 8/1995 | Barber et al. ............................ | 455/432 |
| 5,448,622 | 9/1995 | Huttunen ................................... | 379/58 |
| 5,787,354 | 7/1998 | Gray et al. ............................... | 455/435 |

FOREIGN PATENT DOCUMENTS 0526981  2/1993  European Pat. Off. .

Primary Examiner—Dwayne D. Bost
Assistant Examiner—Nay A. Maung
Attorney, Agent, or Firm—Sughrue, Mion, Zinn, Macpeak & Seas, PLLC

[57] ABSTRACT

A hand-held telephone set having a plurality of telephone numbers, including means registering a plurality of telephone numbers and corresponding various data items such as available areas allowing origination and termination of calls using these telephone numbers, available day and time and telephone numbers of distant parties, means for judging whether the data condition corresponds to the selected telephone number when origination and termination of calls are executed using such telephone number, and means for enabling origination and termination of calls when such data condition is satisfied or enabling origination and termination of calls by judging the other telephone numbers when such data condition is not satisfied.

11 Claims, 4 Drawing Sheets

FIG. 2

| NO. | TELEPHONE NO. | TELEPHONE NO. |
|---|---|---|
| | 0459 39×××× | 0441 2300 00 |
| AVAILABLE AREA NO. | 012 3433<br>012 3434<br>012 3435<br>012 3436<br>012 3437 | 045 678<br>045 679<br>055 233<br>055 234 |
| AVAILABLE TIME SCHEDULE | MON. TUE. WED. THU. FRI. SAT. 07:00-17:00<br>TUE.<br>THU. FRI. 17:00-21:30 | MON. TUE. WED. THU. FRI. 00:00-10:00<br>MON. TUE. WED. THU. FRI. 17:00-00:00<br>SAT. SUN. 00:00-24:00 |
| ORIGINATING TELEPHONE NO. | 0453 21△△△△<br>0333 4535<br>0013 2665 | 045***<br>033*<br>001*** |

HAND-HELD TELEPHONE SET

BACKGROUND OF THE INVENTION

1. Field of the Invention

The present invention relates to a hand-held telephone set and particularly to a hand-held telephone set to which a plurality of telephone numbers can be assigned.

2. Description of the Related Art

With rapid popularization of hand-held telephone sets in these years, there has been a need for assigning two or more telephone numbers to a hand-held telephone set. For example, two different telephone numbers are assigned to a hand-held telephone set and this hand-held telephone set can selectively be put into personal use and business use by selecting the telephone numbers for actual use. Therefore, the telephone rate can be clearly distinguished for business use and personal use. In general, the assigned telephone numbers can be selectively changed in this hand-held telephone set by user's manual manipulation.

However, when two telephone numbers are selected depending only on user's will, it is possible, for example, to make a personal conversation using the telephone number assigned for business use and the telephone rate may be charged to a company. Moreover, it is also conceivable that a conversation, although it is a business conversation, is attempted using the telephone number assigned for personal use and its telephone rate is charged to a person.

As explained above, the requirement for which a user is requested to change over the telephone numbers for the business use and personal use will easily generate various disadvantages. Therefore, it is required to automatically change over the telephone numbers.

A system of automatic changeover of the telephone number is described in the Japanese Patent Laid-Open No. HEI 1-300723. The related art described in this reference is devised not to pay expensive roaming charge by previously storing regional numbers corresponding to different telephone numbers within the telephone set and receiving a signal from a base station of the region to which the telephone set is moved in order to automatically select the most appropriate telephone number of the relevant region as the telephone number of the telephone set.

However, the related art described in this reference cannot be used for changeover of the telephone numbers for business use and personal use because the telephone number is only changed over to that corresponding to the region to which the telephone set is moved. Namely, in this related art, the telephone numbers for business use and personal use cannot be used in the same region and thereby the related art cannot be applied for actual use.

For this reason., it has been considered to limit to the telephone set so that when the telephone number is changed over to the number for business use depending on the company's will, a call can be originated only to the specified parties. However, this limitation may result in the fear that an expectedly large telephone rate is charged on a company when the telephone set is used in the remote area. Moreover, since there is no limitation on the incoming calls, the telephone rate on the basis of cash on delivery, for example, will be charged on a company.

SUMMARY OF THE INVENTION

It is therefore an object of the present invention to provide a hand-held telephone set which suitably limits the telephone numbers changed over to enable adequate use with each telephone number.

The hand-held telephone set having a plurality of telephone numbers of the present invention includes means for registering a plurality of telephone numbers and corresponding various data items such as available areas, available day and time allowing origination and termination of a call with these telephone numbers and the telephone number of a distant party, means for judging the data conditions corresponding to the selected telephone number when a call is originated or terminated with such selected telephone number and means for enabling origination and termination of a call when such data conditions are satisfied and also enabling origination and termination of a call by judging the other telephone numbers when such conditions are not satisfied.

Moreover, there is also provided means for previously registering one or a plurality of available area numbers as various data items of telephone numbers registered and this means is preferably provided such that it is determined whether the current available area number is matched with any one of one or a plurality of available area numbers registered corresponding to the telephone number currently in use, when judged to be matched, the current telephone number is used continuously, or when judged to be unmatched, if there is a telephone number matching with the available area number in one or a plurality of available area numbers registered among the telephone numbers not currently in use, the telephone number is changed over to that number.

There is also provided means for registering one or a plurality of available time schedules as various data items of registered telephone numbers. The time measured with a clock is compared with one or a plurality of available time schedules corresponding to the telephone number currently in use. When the time is judged to be included, the telephone number is used continuously, and when judged not to be included, if there is a telephone number having a time schedule including the current time in one or a plurality of available time schedules among the telephone numbers not currently in use, the telephone number is changed over to the other number.

Moreover, there is also provided means for registering the telephone numbers of distant parties to which one or a plurality of calls may be originated as various data items of registered telephone numbers. It is determined whether the telephone number of distant parties as the object of origination of a call is included in the set telephone numbers of distant parties to which one or a plurality of calls may be originated. When judged to be included, the telephone number is used continuously and when judged not to be included, if there is a telephone number of distant party to which one or a plurality of calls may be originated, not currently in use, the telephone number is changed over to the number not in use for originating a call.

The present invention enables origination and termination of calls only when conditions of data, indicating an area where a telephone set exists, day and time for use and a telephone number of a distant party corresponding to the selected telephone number on the occasion of originating or terminating a call with the selected telephone number, are satisfied. Thereby, use of the telephone set under the condition exceeding the predetermined limitation is inhibited.

Moreover, when origination or termination of a call with the selected telephone number is inhibited, the similar judgement is performed to the other telephone numbers. Thereby, origination and termination of call can be realized after an erroneous telephone number is reselected to the correct telephone number.

BRIEF DESCRIPTION OF THE DRAWINGS

These and other objects, feature and advantages of the present invention will become more fully apparent from the following detailed description taken with the accompanying drawings in which:

FIG. 2 illustrates telephone numbers and various data items registered to EEPROM;

In the drawings, the same reference numerals denote the same structural elements.

DESCRIPTION OF THE PREFERRED EMBODIMENTS

Figure 1:
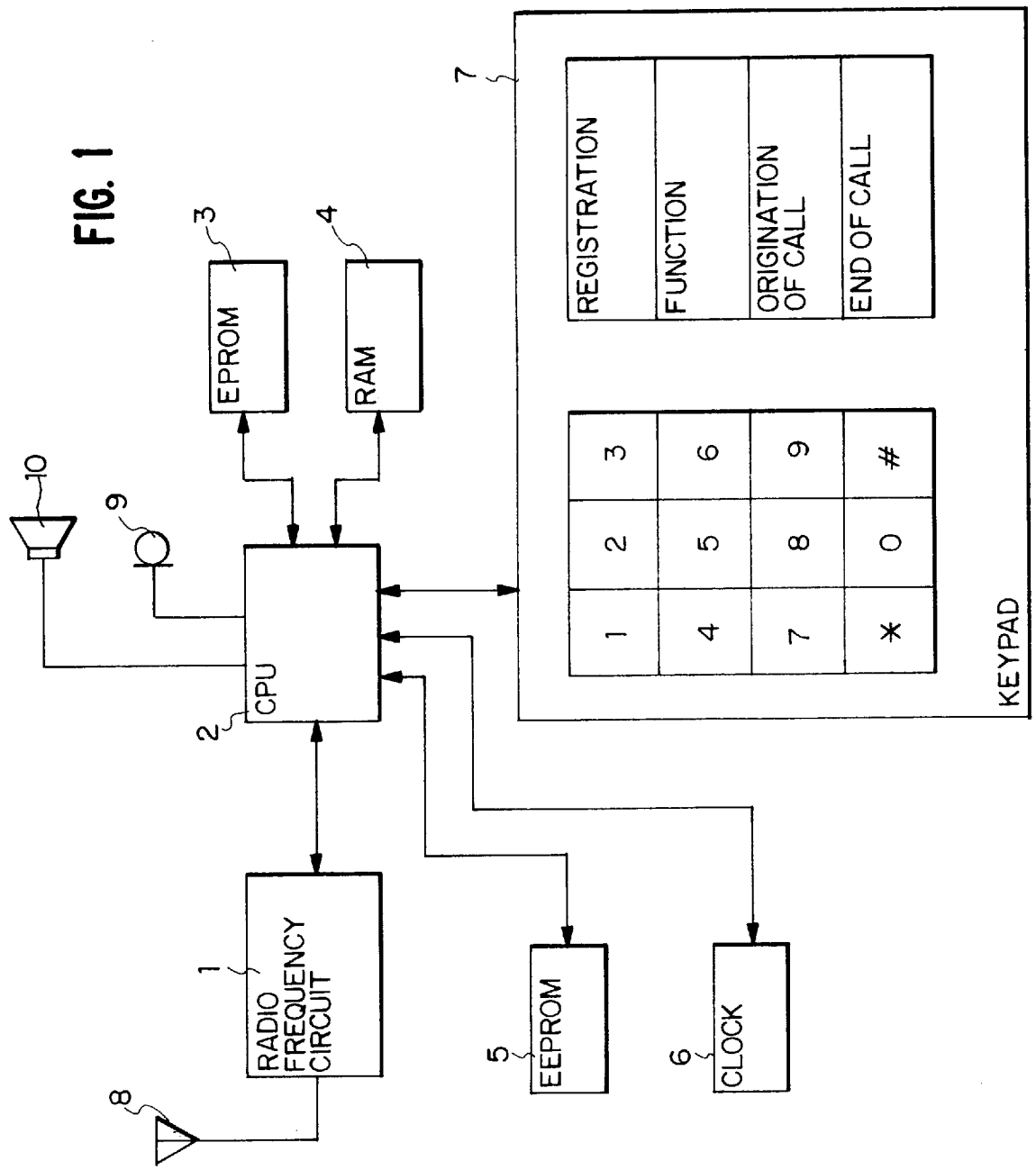
FIG. 1 is a block diagram illustrating an internal constitution of a telephone set to which the present invention is applied.

The preferred embodiments of the present invention will be explained with reference to the accompanying drawings. FIG. 1 is a basic structural diagram of a hand-held telephone set to which the present invention is applied, including a radio frequency circuit 1 for making radio communications through an antenna 8, a CPU 2 for processing the signals to be transmitted and received by this radio frequency circuit 1, EPROM 3 to which the program for operating the CPU 2 is written, RAM 4 for temporarily storing various data items required for processing by CPU 2, EEPROM 5 storing one or a plurality of telephone numbers, two telephone numbers, in this case, and various data items incidental to such telephone numbers, a clock 6, a key pad 7 manually operated by a user, a MIC 9 and a speaker 10.

The CPU 2 selects any one of two telephone numbers stored in EEPROM 5 depending on the program written into EPROM 3 to originate or terminate a call to or from a base station via the radio frequency circuit 1. Moreover, in this case, the CPU 2 restricts the origination or termination of calls by making reference to the data stored in EEPROM 5, the data input to the key pad 7 by user's operation and the time data sent from the clock 6.

FIG. 2 indicates two kinds of telephone numbers held in EEPROM 5. In this case, the EEPROM 5 stores a telephone number for business use for which telephone rate is charged on a company and a telephone number for personal use where the telephone rate is charged to a person, and various data items corresponding to these telephone numbers. Here, the telephone No. 1 "045939xxxx" is offered as the telephone number for business use, while the telephone No. 2 "0441230OOO" is offered as the telephone number for personal use.

Various data items include allowable area number information, allowable time schedule information, and telephone number information for a distant party to which a call can be originated. In the case of the telephone No. 1 for the business use, the area No. "12343" to "12347" are set as the areas in which conversation can be made with such a telephone number. Moreover, 7:00 to 17:00 on Monday to Saturday and 17:00 to 21:00 on Tuesday, Thursday, Friday are set as the available time schedule. In addition, as the telephone number of distant party to which a call can be originated, a plurality of telephone numbers including "045321ΔΔΔΔ" are set.

In the same manner, in the case of telephone No. 2 for personal use, as the area where conversation can be made with such a telephone number, a plurality of area numbers including the area No. "45678" are set. Moreover, as the available time schedule, the day and the time corresponding thereto are set. Moreover, as the telephone number of distant party to which a call can be originated, a plurality of telephone numbers including "045*******" are set.

Figure 3:
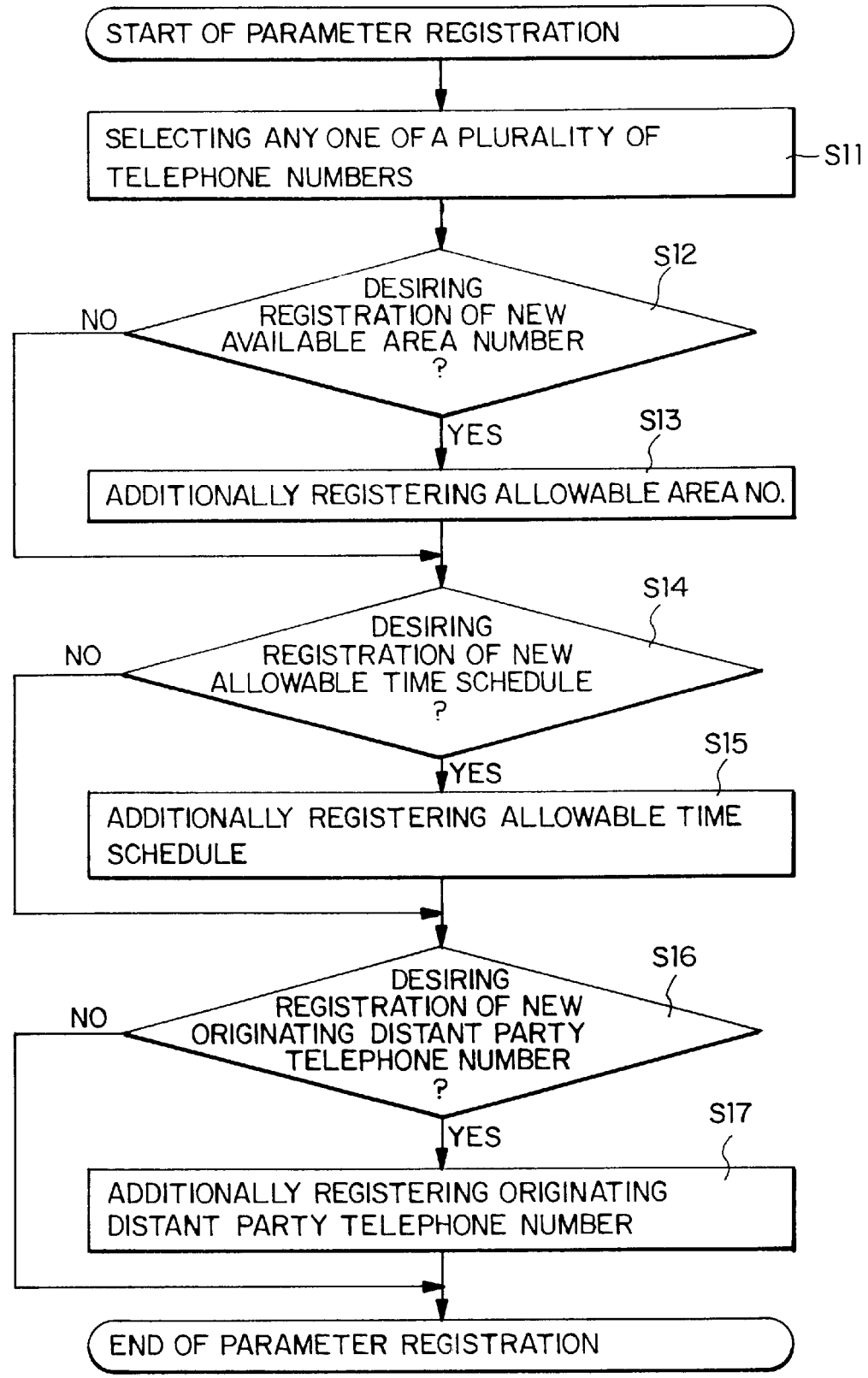
FIG. 3 is a flowchart indicating data registration sequence for EEPROM.

Procedures for registering various data items in EEPROM 5 or for altering such various data items will be explained with reference to FIG. 3. This operation is basically stored as the data depending on the setting desired by a telephone rate payer. In this case, with input of a secret ID number, etc., registration and alteration of data are assumed to be executed for the relevant telephone number by the manipulations explained hereunder. Therefore, in general, a company registers the telephone number for business use depending on the ID number which is unknown for users of the telephone set. Meanwhile, a person registers the telephone number for personal use in the presence of the representative of the company.

First, parameter registration is activated with an input from a registration key provided on a keypad 7. The CPU 2 judges, from the successive data input, whether registration should be made to a telephone number among the designated two telephone numbers and prepares for registration for the relevant telephone number on EEPROM 5 (S11). Registration of a new allowable area number is judged to be desired or not (S12). When it is desired, after a message for inquiring input of the allowable area number is output or its voice signal is output from the telephone set, 1 (="Yes") is input and then the allowable area number is input from the keypad 7. Thereby, the CPU 2 registers the new allowable area number to EEPROM 5 (S13).

Next, after the allowable area number is input or after 0 (="No") is input, it is determined whether an allowable time schedule is desired (S14). When judged to be desired, after 1 (="Yes") is input, the allowable time schedule is input from the keypad 7. Thereby, the CPU 2 registers the new allowable time schedule to EEPROM 5 (S15).

Next, after input of the allowable time schedule or 0 (="No") is input in the message inquiring input of the allowable time schedule, it is judged whether the input of the telephone number of a distant party to which a call may be originated is desired (Sl6). When judged to be desired, after 1 (="Yes") is input, the telephone number for a distant party to which a call may be originated is input. Thereby, the CPU registers the new telephone number of a distant party to EEPROM 5 (S17).

Successively, after input of the telephone number of a distant party to which a call may be originated or input of 0 (="No") in the message inquiring input of the allowable time schedule, operation for registration is terminated. A series of operations for registration can be performed by inputting, in general, the necessary data to the telephone set from the other data input apparatus via the interface such as RS232C, etc.

Figure 4:
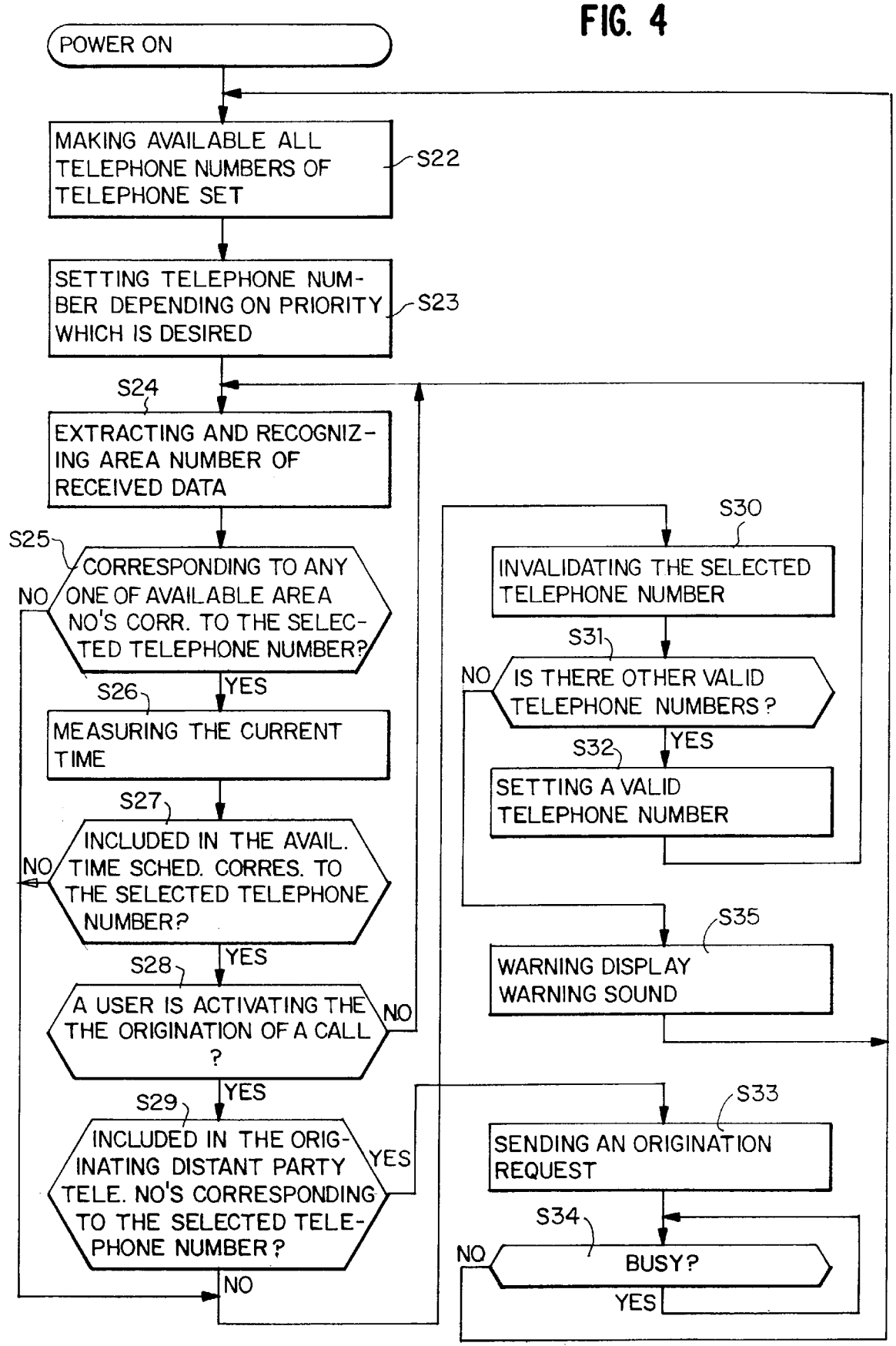
FIG. 4 is a flowchart explaining call originating and terminating operations in the present invention.

The actual conversation sequence by the hand-held telephone set constituted as explained above will be explained with reference to the flowchart of FIG. 4. First, when the power switch is turned ON (S21), CPU 2 stores the telephone No. 1 as the "valid" number and the telephone No. 2 also as the "valid" number in order to make valid two telephone numbers (S22). When a user previously designates the telephone No. 1 preferentially to the telephone No. 2, the telephone No. 1 "045939xxxx" included in EEPROM 5 is positionally registered to the base station as the telephone number of the telephone set (S23).

Data is received from the base station through the radio equipment 1 for continuation of the waiting condition. In the waiting condition, a service area number is always extracted and recognized from the receiving data (S24), it then compared (S25) with any one of the available area numbers "12343" to "12347" on EEPROM 5 corresponding to the telephone No. 1 being selected. When matched, the available time schedule check processing (S26) is started. When unmatched, the telephone No. 1 is stored as "invalid" number in RAM 4 (S30).

In the allowable time schedule check processing (S26), the current day, time (hour, minute) are measured with the clock 6 to check whether these are included or not in any of the time schedules "Monday, Tuesday, Wednesday, thursday, Friday, Saturday 07:00–17:00" or "Tuesday, Thursday, Friday 17:00–21:30" stored in EEPROM 5 (S27). When included, originating distant party telephone number check processing when the origination of call is activated is started (S28). When not included, the Tel No. 1 is stored as "invalid" number in RAM 4 (S30).

In the originating distant party telephone number check processing (S28), CPU 2 inputs the originating distant party telephone number to RAM 4 because key input in the key pad 7 is always monitored. when an origination key is depressed, the origination start operation is initiated to check (S29) whether the originating distant party number which is input before the origination key is depressed and is then stored in RAM 4 is matched or not with any one of the origination allowable numbers stored in EEPROM 5. When unmatched, CPU 2 stores the telephone No. 1 as the "invalid" number in RAM 4 (S30). When matched, an origination request data is transmitted to the base station (S33) and the conversation processing is started (S34). If the origination key is not depressed, the available area number check processing, available time schedule check processing and originating distant party number check processing when the originating operation is activated are repeatedly performed successively so long as the waiting condition can be 10 continued.

In the series of operations, when the telephone No. 1 which is the telephone number currently in use is judged as the "invalid" number in the step S30, the other valid telephone number stored in RAM 4 in the step 22 is retrieved (S31). When existence of the telephone No. 2 is detected as the "valid" telephone number stored in RAM 4, the telephone No. 2 "0441230OOO" stored in EEPROM 5 is in turn set as the valid telephone number of the telephone set (S32) and thereafter this telephone number is positionally registered to the base station through the radio equipment 1 as in the case of the step 23 and the data is received for continuation of the waiting condition.

Thereafter, for the telephone No. 2, the operations of the step S24 and successive steps are performed as in the case of the telephone No. 1 to execute the available area number check processing, available time schedule check processing, originating destination number check processing when the originating operation is started. When the telephone No. 2 is judged as "invalid" number in any processing explained above and thereby there is no "valid" telephone number, use of the telephone set not under the limitation is notified to users with a display or an audible sound (S35).

Therefore, the present embodiment realizes, if a call is originated with the telephone number for business use, origination of the call only in the range of the preset day and time only when the relevant telephone set exists within the available area set in EEPROM and such telephone number of a distant party is also previously set. Accordingly, origination of a call to distant parties under the available conditions not satisfying above conditions is never realized and the telephone rate by use of the telephone set under the conditions other than the preset conditions is never charged on the company.

Moreover, when the available area, day and time, telephone number of distant party in origination of a call satisfy the conditions of the telephone number for personal use, the telephone number of the telephone set is automatically changed over to that for personal use and thereafter origination of call is realized. Therefore, if a user intentionally or erroneously attempts to use the telephone set for the personal use with the telephone number for business use, since origination is realized automatically with the telephone number for personal use, origination is never disabled and moreover the telephone rate is charged on a person because of the personal use.

In addition, in this embodiment, even if a call is terminated when the telephone set is in the waiting condition with the telephone set for business use, termination of call is enabled only when the telephone set exists in the available area within the range of the preset day and time. However, if the condition satisfies the condition preset for the telephone number for personal use even in above case, since a call is terminated with the telephone number for personal use, termination is never disabled. Thereby, the telephone rate in charge on delivery basis generated by personal use is never charged on the company.

In the embodiment explained above, the telephone number for business use has a priority, but when the telephone number for personal use has a priority, only the processing sequence is inverted but the operations identical to those explained above is performed.

Furthermore, the telephone set having two telephone numbers for business use and personal use is explained in above embodiment, but the identical processes can be realized even in the telephone set having three or more telephone numbers by registering these telephone numbers and corresponding various data items to EEPROM and reasonable telephone rates are charged to respective telephone numbers.

As explained above, the hand-held telephone set having a plurality of telephone numbers of the present invention comprises means for registering a plurality of telephone numbers and corresponding various data items such as available area allowing origination or termination of calls with such telephone numbers, available day and time and telephone numbers of distant parties to judge the data condition whether it corresponds to the telephone number or not at the time of origination or termination of a call with the selected telephone number so that when the data condition is satisfied, origination or termination is enabled and when not satisfied, origination or termination is enabled by judging the other telephone numbers. Thereby, use of the telephone set under the condition exceeding the preset limit for each telephone number is inhibited and meanwhile similar judgement is made to the other telephone numbers to enable origination or termination of calls after the correct telephone number is selected again in place of the erroneous telephone number.

Thereby, since use of the telephone set with the predetermined telephone number is always enabled even when a user of the telephone set does not change the telephone number, it can be avoided that a user intentionally or erroneously use the telephone set using inadequate telephone number. Accordingly, disadvantages, for example, that the conversation which should be charged on the company are charged on a person because such conversation is made with the telephone number for personal use or personal conversation is charged on the company because such conversation is made using the telephone number for business use, can be eliminated.

Here, since means for previously registering one or a plurality of available area numbers as various data items of each telephone number registered, means for registering one or a plurality of available time schedules and means for registering one or a plurality of telephone numbers of distant parties to which a call may be originated are comprised, adequacy of conversation with the telephone number used can be judged regarding the area wherein the telephone set is used, day and time and telephone numbers of distant parties, and use of inadequate telephone numbers can suitably be inhibited.

While the invention has been described with reference to specific embodiments thereof, it will be appreciated by those skilled in the art that numerous variations, modifications, and embodiments are possible, and accordingly, all such variations, modifications, and embodiments are to be regarded as being within the spirit and scope of the invention.

What is claimed is:

1. A hand-held telephone set identified by a plurality of telephone numbers, comprising:

means for storing a plurality of available area numbers for each of said plurality of telephone numbers, said plurality of available area numbers respectively corresponding to available areas within which origination and termination of calls by said hand-held telephone set are permitted;

means for judging whether said hand-held telephone set is located within one of said available areas of a selected telephone number;

means for enabling origination and termination of call by said hand-held telephone set when said hand-held telephone set is located within one of said available areas;

clock means;

means for storing at least one allowable time schedule for each of said plurality of telephone numbers, said at least one allowable time schedule indicating when said hand-held telephone set is operable;

means for judging whether a time measured by said clock means is included within said at least one allowable time schedule corresponding to a current telephone number; and means for continuing use of said current telephone number when said time is included in said at least one allowable time schedule, and for changing to another one of said plurality of telephone numbers, when another telephone number exists which corresponds to said hand-held telephone set and corresponds to an allowable time schedule which includes said time, when said time is not included in said at least one allowable time schedule.

2. A hand-held telephone set identified by a plurality of telephone numbers, comprising:

means for storing a plurality of available area numbers for each of said plurality of telephone numbers, said plurality of available area numbers respectively corresponding to available areas within which origination and termination of calls by said hand-held telephone set are permitted;

means for judging whether said hand-held telephone set is located within one of said available areas of a selected telephone number;

means for enabling origination and termination of call by said hand-held telephone set when said hand-held telephone set is located within one of said available areas;

means for storing at least one telephone number of distant parties for each of said plurality of telephone numbers, means for judging whether a current telephone number of a distant party for call origination is included in said at least one telephone number of distant parties corresponding to a telephone number of said hand-held telephone set currently valid for use, and means for originating the call when said current telephone number is included in said at least one telephone number of distant parties, and changing, for origination of the call, to another one of said plurality of telephone numbers, when another telephone number exists which corresponds to said hand-held telephone set and corresponds to said current telephone number, when said current telephone number is not included in said at least one telephone number of distant parties.

3. A method of controlling a hand-held telephone set identified by a plurality of telephone numbers, comprising:

storing said plurality of telephone numbers and a plurality of available area numbers, for each of said telephone numbers, said plurality of available area numbers respectively representing available areas for which call origination and termination is permitted;

judging whether a current available area number corresponds to one of said available area numbers for a current telephone number when origination and termination of a call is performed;

enabling, when said current available area number matches one of said available area numbers for said current telephone number, origination and termination of the call and also enabling, when said current available area number does not match one of said available area numbers for said current telephone number, origination and termination of the call by another one of said plurality of telephone numbers when another telephone number exists which corresponds to said hand-held telephone set and which includes an available area number which matches said current available area number;

measuring a plurality of times;

storing at least one allowable time schedule for each of said plurality of telephone numbers;

judging whether a time measured in said time measuring step is included in said at least one allowable time schedule corresponding to said current telephone number; and continuing use of said current telephone number when said time is included in said at least one allowable time schedule and changing to another one of said plurality of telephone numbers when another telephone number exists which corresponds to an allowable time schedule which includes said time, when said time is not included in said at least one allowable time schedule.

4. A method of controlling a hand-held telephone set identified by a plurality of telephone numbers, comprising:

storing said plurality of telephone numbers and a plurality of available area numbers, for each of said telephone numbers, said plurality of available area numbers respectively representing locations for which call origination and termination is permitted;

judging whether a current available area number corresponds to one of said available area numbers for a current telephone number when origination and termination of a call is performed;

extracting and recognizing said current available area number from waiting reception data;

judging whether the current available area number matches or not with any one of one or a plurality of allowable area numbers corresponding to the current telephone number; and continuously using, when judged to be matched by said judging means the current telephone number and changing over, when judged not to be matched, the current telephone number to another one of said plurality of telephone numbers, which matches said current available area, is not in use;

storing at least one telephone number of distant parties for each of said plurality of telephone numbers;

judging whether a current telephone number of a distant party for a call origination is included in said at least one telephone number of distant parties corresponding to a telephone number of said hand-held telephone set currently being used;

originating the call when said current telephone number is included in said at least one telephone number of distant parties, and changing to another one of said plurality of telephone numbers, when said current telephone number is not included in said at least one telephone number of distant parties, when another telephone number exists which corresponds to said current telephone number.

5. A hand-held telephone set identified by a plurality of telephone numbers, comprising:

means for storing a plurality of available area numbers for each of said plurality of telephone numbers, said plurality of available area numbers respectively corresponding to available areas within which origination and termination of calls by said hand-held telephone set are permitted;

means for judging whether said hand-held telephone set is located within one of said available areas of a selected telephone number;

means for enabling origination and termination of call by said hand-held telephone set when said hand-held telephone set is located within one of said available areas;

means for storing available time/day information, for which origination and termination of calls by said hand-held telephone set is permitted, for each of said plurality of telephone numbers.

6. A hand-held telephone set identified by a plurality of telephone numbers, comprising:

means for storing a plurality of available area numbers for each of said plurality of telephone numbers, said plurality of available area numbers respectively corresponding to available areas within which origination and termination of calls by said hand-held telephone set are permitted;

means for judging whether said hand-held telephone set is located within one of said available areas of a selected telephone number;

means for enabling origination and termination of call by said hand-held telephone set when said hand-held telephone set is located within one of said available areas;

means for storing available telephone numbers of distant parties, for which origination and termination of calls by said hand-held telephone set is permitted, for each of said plurality of telephone numbers.

7. A hand-held telephone set identified by a plurality of telephone numbers, comprising:

means for storing a plurality of available area numbers for each of said plurality of telephone numbers, said plurality of available area numbers respectively corresponding to available areas within which origination and termination of calls by said hand-held telephone set are permitted;

means for judging whether said hand-held telephone set is located within one of said available areas of a selected telephone number;

means for enabling origination and termination of call by said hand-held telephone set when said hand-held telephone set is located within one of said available areas;

means for storing available time/day information, for which origination and termination of calls by said hand-held telephone set is permitted, for each of said plurality of telephone numbers; and means for storing available telephone numbers of distant parties, for which origination and termination of calls by said hand-held telephone set is permitted, for each of said plurality of telephone numbers.

8. A hand-held telephone set identified by a plurality of telephone numbers, comprising:

clock means, means for storing at least one allowable time schedule for each of said plurality of telephone numbers, said at least one allowable time schedule indicating when said hand-held telephone set is operable, means for judging whether a time measured by said clock means is included within said at least one allowable time schedule corresponding to a current telephone number, and means for continuing use of said current telephone number when said time is included in said at least one allowable time schedule, and for changing to another one of said plurality of telephone numbers, when another telephone number exists which corresponds to said hand-held telephone set and corresponds to an allowable time schedule which includes said time, when said time is not included in said at least one allowable time schedule.

9. A hand-held telephone set identified by a plurality of telephone numbers, comprising:

means for storing at least one telephone number of distant parties for each of said plurality of telephone numbers, means for judging whether a current telephone number of a distant party for call origination is included in said at least one telephone number of distant parties corresponding to a telephone number of said hand-held telephone set currently valid for use, and means for originating the call when said current telephone number is included in said at least one telephone number of distant parties, and changing, for origination of the call, to another one of said plurality of telephone numbers, when another telephone number exists which corresponds to said hand-held telephone set and corresponds to said current telephone number, when said current telephone number is not included in said at least one telephone number of distant parties.

10. A method of controlling a hand-held telephone set identified by a plurality of telephone numbers, comprising:

measuring a plurality of times;

storing at least one allowable time schedule for each of said plurality of telephone numbers;

judging whether a time measured in said time measuring step is included in said at least one allowable time schedule corresponding to a current telephone number; and continuing use of said current telephone number when said time is included in said at least one allowable time schedule and changing to another one of said plurality of telephone numbers when another telephone number exists which corresponds to an allowable time schedule which includes said time, when said time is not included in said at least one allowable time schedule.

11. A method of controlling a hand-held telephone set identified by a plurality of telephone numbers, comprising:

storing at least one telephone number of distant parties for each of said plurality of telephone numbers;

judging whether a current telephone number of a distant party for a call origination is included in said at least one telephone number of distant parties corresponding to a telephone number of said hand-held telephone set currently being used;

originating the call when said current telephone number is included in said at least one telephone number of distant parties, and changing to another one of said plurality of telephone numbers, when said current telephone number is not included in said at least one telephone number of distant parties, when another telephone number exists which corresponds to said current telephone number.

* * * * *